(12) United States Patent
You et al.

(10) Patent No.: US 10,637,970 B2
(45) Date of Patent: Apr. 28, 2020

(54) PACKET PROCESSING METHOD AND APPARATUS

(71) Applicant: Huawei Technologies Co., Ltd., Shenzhen (CN)

(72) Inventors: Jianjie You, Shenzhen (CN); Haibin Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 219 days.

(21) Appl. No.: 15/619,218

(22) Filed: Jun. 9, 2017

(65) Prior Publication Data

US 2017/0279938 A1 Sep. 28, 2017

Related U.S. Application Data

(63) Continuation of application No. PCT/CN2015/094721, filed on Nov. 16, 2015.

(30) Foreign Application Priority Data

Dec. 11, 2014 (CN) .......................... 2014 1 0765147

(51) Int. Cl.
*H04L 29/06* (2006.01)
*H04L 12/741* (2013.01)

(52) U.S. Cl.
CPC .............. *H04L 69/22* (2013.01); *H04L 45/74* (2013.01)

(58) Field of Classification Search
CPC ......... H04L 51/04; H04L 51/22; H04L 51/38; H04M 1/72552
See application file for complete search history.

(56) References Cited

U.S. PATENT DOCUMENTS

| 2009/0037713 A1 | 2/2009 | Khalid et al. |
| 2010/0080226 A1 | 4/2010 | Khalid et al. |
| 2011/0249674 A1 | 10/2011 | Chang et al. |
| 2013/0121137 A1 | 5/2013 | Feng et al. |

(Continued)

FOREIGN PATENT DOCUMENTS

| CN | 101110772 A | 1/2008 |
| CN | 101355505 A | 1/2009 |

(Continued)

OTHER PUBLICATIONS

H. Song, "SFC Header Mapping for Legacy SF," draft-song-sfc-legacy-sf-mapping-04, SFC Working Group, Dec. 9, 2014.*

(Continued)

*Primary Examiner* — Walli Z Butt
*Assistant Examiner* — Ryan C Kavleski
(74) *Attorney, Agent, or Firm* — Leydig, Voit & Mayer, Ltd.

(57) ABSTRACT

A packet processing method and an apparatus are provided. A first SFC proxy of a first SF entity splits a first packet to obtain a first original packet and a first SFC header, and the first SFC proxy sends the first SFC header to a second SFF. The first SF entity processes the first original packet to obtain a second original packet, and sends the second original packet to a service classifier. The service classifier sends, to the second SFF, a second packet that is obtained after the service classifier adds a second SFC header to the second original packet. The second SFF changes the second SFC header in the second packet into the first SFC header. In this way, a first packet carrying a first SFC header can be transmitted in a network architecture in which a legacy SF exists, so that the legacy SF becomes compatible.

10 Claims, 6 Drawing Sheets

(56) References Cited

U.S. PATENT DOCUMENTS

| | | | |
|---|---|---|---|
| 2013/0170424 A1 | 7/2013 | Anchan et al. | |
| 2013/0259060 A1 | 10/2013 | Liu et al. | |
| 2015/0381478 A1* | 12/2015 | Zhang | H04L 45/306 370/392 |
| 2016/0028640 A1* | 1/2016 | Zhang | H04L 45/306 370/389 |
| 2016/0099853 A1* | 4/2016 | Nedeltchev | H04L 43/0852 370/253 |

FOREIGN PATENT DOCUMENTS

| | | |
|---|---|---|
| CN | 101772918 A | 7/2010 |
| CN | 102130826 A | 7/2011 |
| CN | 104025546 A | 9/2014 |

OTHER PUBLICATIONS

Halpern et al., "Service Function Chaining (SFC) Architecture draft-ietf-sfc-architecture-02," Network Working Group, Internet-Draft, Intended Status: Standards Track, pp. 1-26, Internet Engineering Task Force, Sep. 20, 2014.*
Song et al., "SFC Header Mapping for Legacy SF draft-song-sfc-legacy-sf-mapping-01," SFC Working Group, Internet Draft, Intended Status: Standards Track, pp. 1-11, IETF (Apr. 14, 2014).
Song et al., "SFC Header Mapping for Legacy SF," SFC Header Mapping for Legacy SF, draft-song-sfc-legacy-sf-mapping-03, SFC working group, Internet-Draft (Sep. 29, 2014).
Song et al., SFC Header Mapping for Legacy SF, draft-song-sfc-legacy-sf-mapping-04, SFC working group, Internet-Draft (Dec. 9, 2014).

* cited by examiner

FIG. 1

A second SFF receives a first service function chain header sent by a first SFF, where the first service function chain header is obtained and sent to the first SFF after a first SFC proxy of a first SF entity attached to the first SFF splits a first packet, and the first packet includes the first service function chain header and a first original packet — 200

The second SFF receives a second packet that is obtained and sent by a service classifier after the service classifier adds a second service function chain header to a second original packet, where the second original packet is obtained by processing the first original packet by the first SF entity — 210

The second SFF changes the second service function chain header in the second packet into the first service function chain header — 220

CONT.
FROM
FIG. 3A-1

The service classifier receives the second original packet that is obtained by processing the first original packet by the first SF entity, and after determining, according to characteristic information included in the second original packet, an SFC to which the first packet belongs, determines path information of the SFC as second path information included in a second service function chain header ⟋ 360

The service classifier adds the second service function chain header to the second original packet to obtain a second packet, and sends the second packet carrying the second service function chain header to the second SFF, where the second service function chain header includes the second path information ⟋ 370

When determining that the second path information is the same as first path information, the second SFF modifies the second service function chain header in the second packet as the first service function chain header, to obtain a third packet ⟋ 380

The second SFF sends the third packet to a second SF entity attached to the second SFF for processing ⟋ 390

PACKET PROCESSING METHOD AND APPARATUS

CROSS-REFERENCE TO RELATED APPLICATIONS

This application is a continuation of International Application No. PCT/CN2015/094721, filed on Nov. 16, 2015, which claims priority to Chinese Patent Application No. 201410765147.X, filed on Dec. 11, 2014. The disclosures of the aforementioned applications are hereby incorporated by reference in their entireties.

TECHNICAL FIELD

The present invention relates to the field of communications technologies, and in particular, to a packet processing method and an apparatus.

BACKGROUND

As service types increase, a service routing network needs to be deployed in a network to improve service quality. At present, a service function chain (SFC) technology is generally used to transmit a packet in the service routing network.

Figure 1:
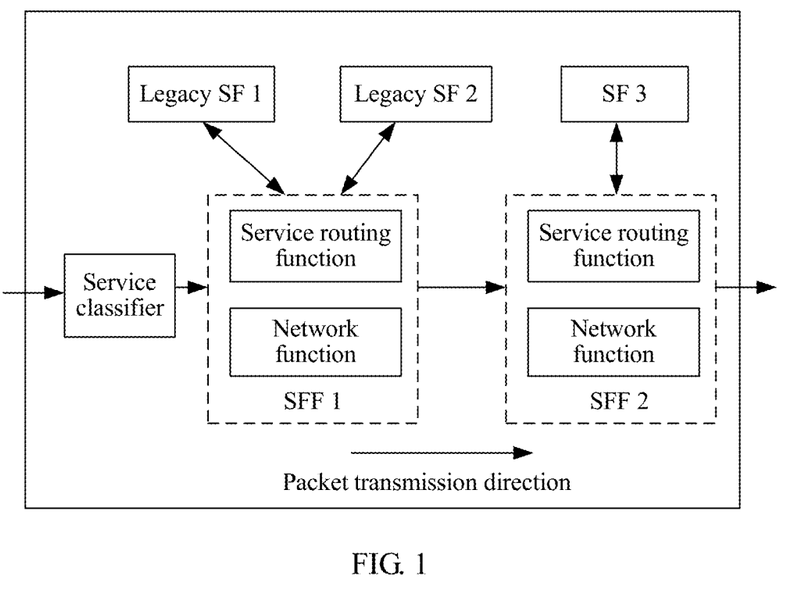
FIG. 1 is a schematic diagram of packet processing in the prior art.

As shown in FIG. 1, a main idea of the SFC technology is that a service classifier (SCLA) classifies a packet and sends the classified packet to a service function forwarder (SFF) to which a corresponding service function (SF) entity is attached, and the SFF sends the packet to the corresponding SF entity for processing.

The packet entering the service routing network is encapsulated with a service function chain header, and the service function chain header includes information about a service function chain. The SFF sends, according to the service function chain header of the packet, the received packet to the corresponding SF entity for processing. The corresponding SF entity encapsulates processing result information of the packet into the service function chain header. However, the SF entity includes some legacy SF entities, and the legacy SF entities do not support a packet that carries a service function chain header. Therefore, how to be better compatible with a legacy SF, so as to transmit, in a network architecture in which a legacy SF exists, a packet carrying a service function chain header becomes a problem that needs to be resolved.

SUMMARY

Embodiments of the present invention provide a packet processing method and an apparatus, to resolve a current problem that a packet carrying a service function chain header cannot be transmitted in a network architecture in which a legacy SF exists.

According to a first aspect, a packet processing method is provided, including:

receiving, by a second service function forwarder SFF, a first service function chain header sent by a first SFF, where the first service function chain header is obtained and sent to the first SFF after a first service function chain SFC proxy of a first service function SF entity attached to the first SFF splits a first packet, and the first packet includes the first service function chain header and a first original packet;

receiving, by the second SFF, a second packet that is obtained and sent by a service classifier after the service classifier adds a second service function chain header to a second original packet, where the second original packet is obtained by processing the first original packet by the first SF entity; and changing, by the second SFF, the second service function chain header in the second packet into the first service function chain header.

With reference to the first aspect, in a first possible implementation manner, the changing, by the second SFF, the second service function chain header in the second packet into the first service function chain header includes:

changing, by the second SFF, the second service function chain header in the second packet into the first service function chain header according to path information included in the first service function chain header and path information included in the second service function chain header.

With reference to the first aspect or the first possible implementation manner of the first aspect, in a second possible implementation manner, the changing, by the second SFF, the second service function chain header in the second packet into the first service function chain header includes:

changing, by the second SFF, the second service function chain header in the second packet into the first service function chain header when determining that the path information included in the first service function chain header is the same as the path information included in the second service function chain header.

With reference to any one of the first aspect, or the first to the second possible implementation manners of the first aspect, in a third possible implementation manner, the second service function chain header is specifically obtained after the service classifier determines, according to characteristic information included in the second original packet, an SFC to which the first packet belongs and then adds path information of the SFC as the second path information, and second metadata in the second service function chain header is empty or includes initial information.

According to a second aspect, a service function forwarder SFF is provided, including:

a receiving unit, configured to receive a first service function chain header sent by a first SFF, where the first service function chain header is obtained and sent to the first SFF after a first service function chain SFC proxy of a first service function SF entity attached to the first SFF splits a first packet, and the first packet includes the first service function chain header and a first original packet, where the receiving unit is further configured to receive a second packet that is obtained and sent by a service classifier after the service classifier adds a second service function chain header to a second original packet, where the second original packet is obtained by processing the first original packet by the first SF entity; and a change unit, configured to change the second service function chain header in the second packet into the first service function chain header.

With reference to the second aspect, in a first possible implementation manner, the change unit is specifically configured to change the second service function chain header in the second packet into the first service function chain header according to path information included in the first service function chain header and path information included in the second service function chain header.

With reference to the second aspect or the first possible implementation manner of the second aspect, in a second possible implementation manner, the change unit is specifically configured to change the second service function chain header in the second packet into the first service function chain header when determining that the path information included in the first service function chain header is the same as the path information included in the second service function chain header.

With reference to any one of the second aspect, or the first to the second possible implementation manners of the second aspect, in a third possible implementation manner, the second service function chain header is specifically obtained after the service classifier determines, according to characteristic information included in the second original packet, an SFC to which the first packet belongs and then adds path information of the SFC as the second path information, and metadata in the second service function chain header is empty or includes initial information.

According to a third aspect, a service function chain SFC proxy is provided, including:

a receiving unit, configured to receive, as a proxy of a first service function SF entity, a first packet sent by a first service function forwarder SFF, where the first packet includes a first service function chain header and a first original packet;

a splitting unit, configured to split the first packet to obtain the first service function chain header and the first original packet; and a sending unit, configured to send the first original packet to the first SF entity and return the first service function chain header to the first SFF.

With reference to the third aspect, in a first possible implementation manner, the receiving unit is further configured to receive a second original packet that is obtained by processing the first original packet by the first SF entity; and the sending unit is further configured to send the second original packet to a service classifier.

According to a fourth aspect, a service function SF entity is provided, where the SF entity is attached to a first service function forwarder SFF, and includes:

a receiving unit, configured to receive a first original packet sent by a first service function chain SFC proxy of the SF entity, where the first original packet is obtained after the first SFC proxy splits a received first packet sent by the first SFF, and the first packet includes the first original packet and a first service function chain header;

a processing unit, configured to process the first original packet to obtain a second original packet; and a sending unit, configured to send the second original packet to a service classifier.

According to a fifth aspect, a service classifier is provided, including:

a receiving unit, configured to receive a second original packet, where the second original packet is obtained by processing a first original packet by a first service function SF entity attached to a first service function forwarder SFF, the first original packet is obtained after a first service function chain SFC proxy of the first SF entity splits a received first packet sent by the first SFF, and the first packet includes the first original packet and a first service function chain header;

an adding unit, configured to add a second service function chain header to the second original packet to obtain a second packet, where the second service function chain header includes second path information; and a sending unit, configured to send the second packet to a second SFF.

With reference to the fifth aspect, in a first possible implementation manner, the adding unit is specifically configured to:

after determining, according to characteristic information included in the second original packet, an SFC to which the first packet belongs, add path information of the SFC as the second path information, and set metadata included in the second service function chain header to be empty or to include initial information.

According to a sixth aspect, a service function forwarder SFF is provided, including:

a first sending unit, configured to send a first packet to a first service function SF entity attached to the SFF;

a receiving unit, configured to receive a first service function chain header that is obtained and returned by a first service function chain SFC proxy of the first SF entity after the first service function chain SFC proxy of the first SF entity splits the first packet, where the first packet includes a first original packet and the first service function chain header; and a second sending unit, configured to send the first service function chain header to a second SFF.

In the embodiments of the present invention, a second SFF receives a first service function chain header sent by a first SFF, where the first service function chain header is obtained and sent to the first SFF after a first SFC proxy of a first SF entity attached to the first SFF splits a first packet, and the first packet includes the first service function chain header and a first original packet. The second SFF receives a second packet that is obtained and sent by a service classifier after the service classifier adds a second service function chain header to a second original packet, where the second original packet is obtained by processing the first original packet by the first SF entity. The second SFF changes the second service function chain header in the second packet into the first service function chain header. In the solutions, the first SFC proxy of the first SF entity splits the first packet to obtain the first original packet and the first service function chain header, sends the first original packet to the first SF entity for processing, and sends the first service function chain header to the first SFF. The first SFF sends the first service function chain header to the second SFF. The first SF entity processes the first original packet to obtain the second original packet, and sends the second original packet to the service classifier. The service classifier sends, to the second SFF, the second packet that is obtained after the service classifier adds the second service function chain header to the second original packet. The second SFF changes the second service function chain header in the second packet into the first service function chain header. In this way, a first packet carrying a first service function chain header can be transmitted in a network architecture in which a legacy SF exists, so that the legacy SF becomes compatible.

BRIEF DESCRIPTION OF DRAWINGS

FIG. 3A-1 and FIG. 3A-2 show an embodiment of packet processing according to an embodiment of the present invention;

DESCRIPTION OF EMBODIMENTS

To make objectives, technical solutions, and advantages of embodiments of the present invention clearer, the following clearly describes the technical solutions in the embodiments of the present invention with reference to accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, embodiments of the present invention are described in detail with reference to the accompanying drawings. It should be understood that the embodiments described herein are merely used to illustrate and explain the present invention, but are not intended to limit the present invention. In addition, the embodiments of the present application and features in the embodiments may be mutually combined when they do not conflict with each other.

In the following, the embodiments of the present invention are described in detail with reference to the accompanying drawings.

Figure 2A:
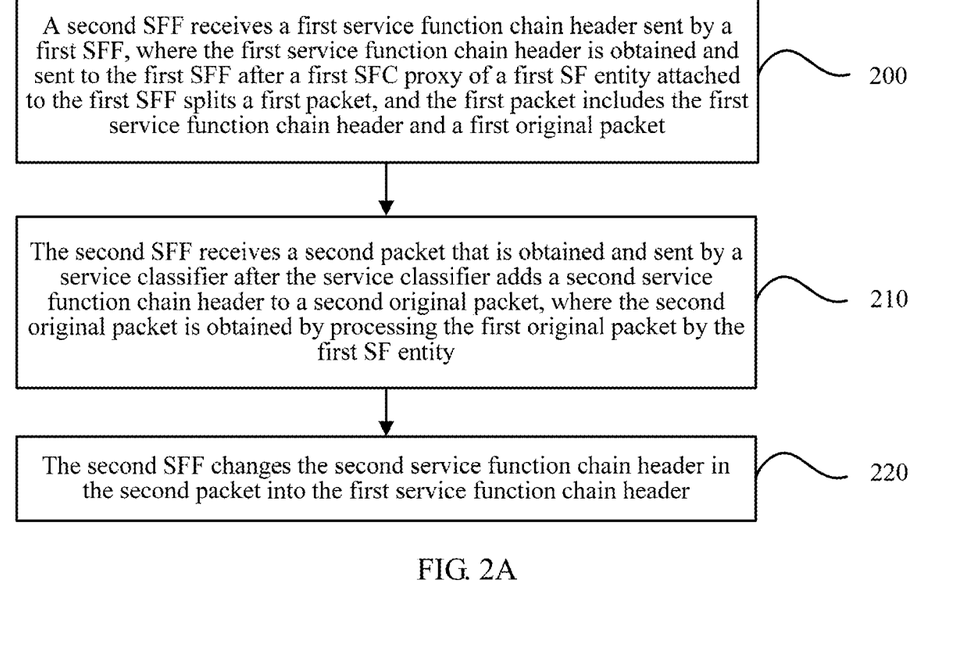
FIG. 2A is a flowchart of packet processing according to an embodiment of the present invention.

Referring to FIG. 2A, in an embodiment of the present invention, a procedure of packet processing is as follows:

Step 200: A second SFF receives a first service function chain header sent by a first SFF, where the first service function chain header is obtained and sent to the first SFF after a first SFC proxy of a first SF entity attached to the first SFF splits a first packet, and the first packet includes the first service function chain header and a first original packet.

Step 210: The second SFF receives a second packet that is obtained and sent by a service classifier after the service classifier adds a second service function chain header to a second original packet, where the second original packet is obtained by processing the first original packet by the first SF entity.

Step 220: The second SFF changes the second service function chain header in the second packet into the first service function chain header.

In this embodiment of the present invention, optionally, when the second SFF changes the second service function chain header in the second packet into the first service function chain header, the following manner may be used.

The second SFF changes the second service function chain header in the second packet into the first service function chain header according to path information included in the first service function chain header and path information included in the second service function chain header.

Alternatively, when the second SFF changes the second service function chain header in the second packet into the first service function chain header, the following manner is used.

The second SFF changes the second service function chain header in the second packet into the first service function chain header when determining that the path information included in the first service function chain header is the same as the path information included in the second service function chain header.

In this embodiment of the present invention, optionally, the path information may include information such as a path identifier Path ID.

In this embodiment of the present invention, optionally, the second service function chain header is specifically obtained after the service classifier determines, according to characteristic information included in the second original packet, an SFC to which the first packet belongs and then adds path information of the SFC as the second path information.

For example, the second original packet is a packet of a Session Initiation Protocol (SIP) call. The service classifier may determine, according to information such as a calling party, a called party, or a transaction number in the packet, an SFC to which the packet belongs, use path information of the SFC as the second path information, and add the second path information to the second service function chain header.

Figure 2B:
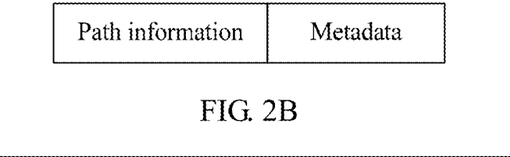
FIG. 2B is a schematic diagram of a service function chain header according to an embodiment of the present invention.

Optionally, as shown in FIG. 2B, a service function chain header in this embodiment of the present invention includes path information and metadata. Specifically, the first service function chain header includes the first path information and first metadata, and the second service function chain header includes the second path information and second metadata.

Optionally, the second metadata in the second service function chain header is empty or includes initial information.

In this embodiment of the present invention, optionally, the initial information is information such as a user name of a user who first sends a packet.

In this embodiment of the present invention, optionally, the first metadata may include processing result information obtained after an SF entity before the first SF entity in the SFC processes the first packet. In this way, the second SFF may determine a subsequent forwarding path according to the processing result information. For different processing results, subsequent forwarding paths may be different. If the processing result information is absent, the subsequent forwarding path may not be determined, and consequently, transmission is interrupted.

In addition, after a second SF entity attached to the second SFF obtains the processing result information that is obtained after the SF entity before the first SF entity processes the first packet, efficiency of processing a packet by the second SF entity may be improved.

For example, an SFC includes five SFFs. After an SF 1 entity in an SFF 1 processes a packet, an SF 2 entity in an SFF 2 processes a packet, and an SF 3 entity in an SFF 3 processes a packet, a processed packet is sent to an SFF 4, the first packet received by the SFF 4 includes a first service function chain header, and first metadata in the first service function chain header includes processing result information obtained after the SF 1 entity, the SF 2 entity, and the SF 3 entity separately process the first packet. In this way, when the SF 1 entity performs some operations on the first packet, an SF 4 entity in the SFF 4 may avoid, according to the first metadata, performing the same operations on the received packet, thereby improving processing efficiency.

Optionally, a packet obtained after the second SFF changes the second service function chain header in the second packet into the first service function chain header is referred to as a third packet herein. After obtaining the third packet, the second SFF sends the third packet to the second SF entity attached to the second SFF for processing.

If the second SF entity supports processing on a service function chain header, the second SFF directly sends the third packet to the second SF entity attached to the second SFF for processing.

Alternatively, if the second SF entity does not support processing on a service function chain header, that is, the second SF entity is a legacy SF entity, in a process in which the second SFF sends the third packet to the second SF entity, the third packet is captured by a second SFC proxy of the second SF entity for processing. Alternatively, after the second SFF sends the third packet to the second SF entity, when the second SF entity finds that the third packet carries a service function chain header, the second SF entity sends the third packet to a second SFC proxy for processing.

In this embodiment of the present invention, an SF entity, an SFC proxy of the SF entity, and an SFF to which the SF entity is attached may be disposed in a same device. For example, the SF entity and the SFC proxy of the SF entity are a module in the SFF, and communication between the SFF and the SF entity is privately implemented. An SF entity and an SFC proxy of the SF entity may be independent of an SFF. For example, the SF entity and the SFC proxy of the SF entity may be an independent server, a virtual machine (VM) in a server, or a dedicated hardware device.

In this embodiment of the present invention, a premise of processing the first packet by the first SFC proxy is that the first packet needs to be received. Optionally, the first SFC proxy may receive the first packet in the following manners.

For example, the first SFF sends the first packet to the first SF entity, and the first SF entity sends the first packet to the first SFC proxy when determining that processing of the first packet carrying the first service function chain header is not supported.

Alternatively, in a process in which the first SFF sends the first packet to the first SF entity, the first packet is captured by the first SFC proxy of the first SF entity.

Figure 3A:
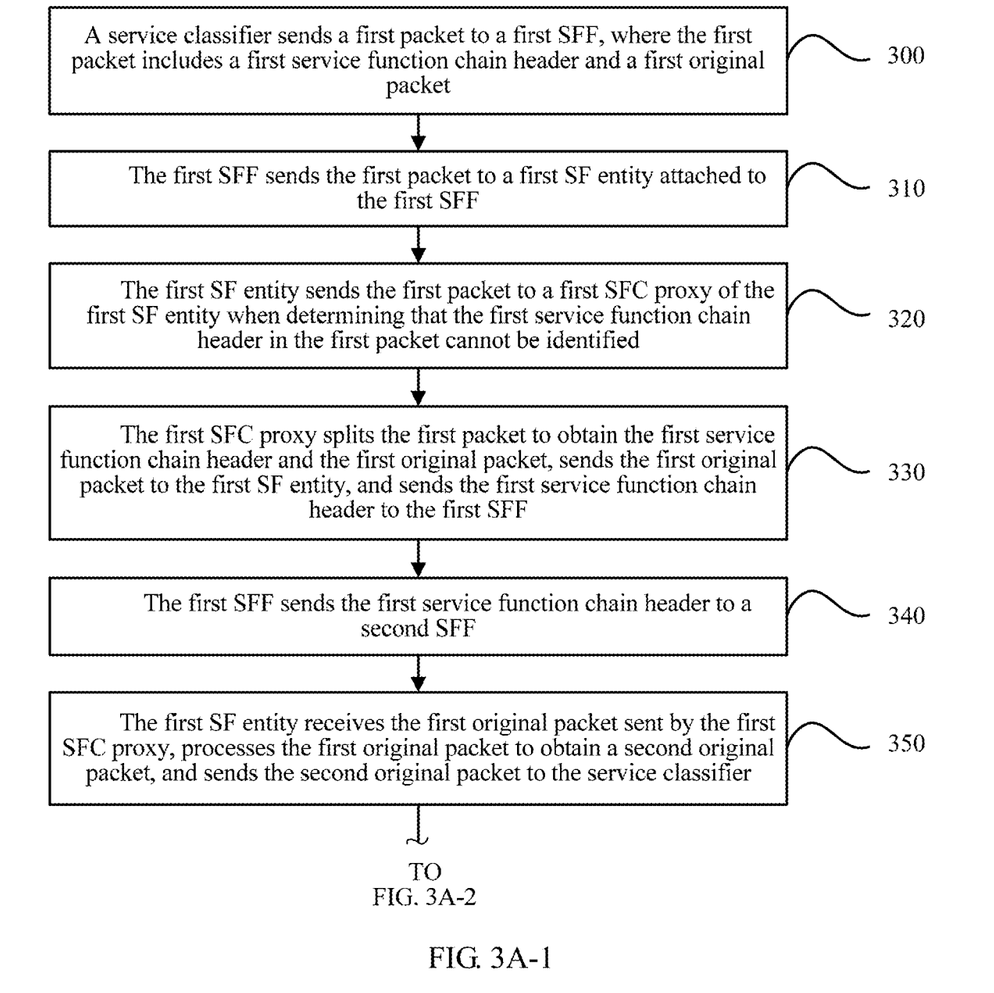
Figure 3A:
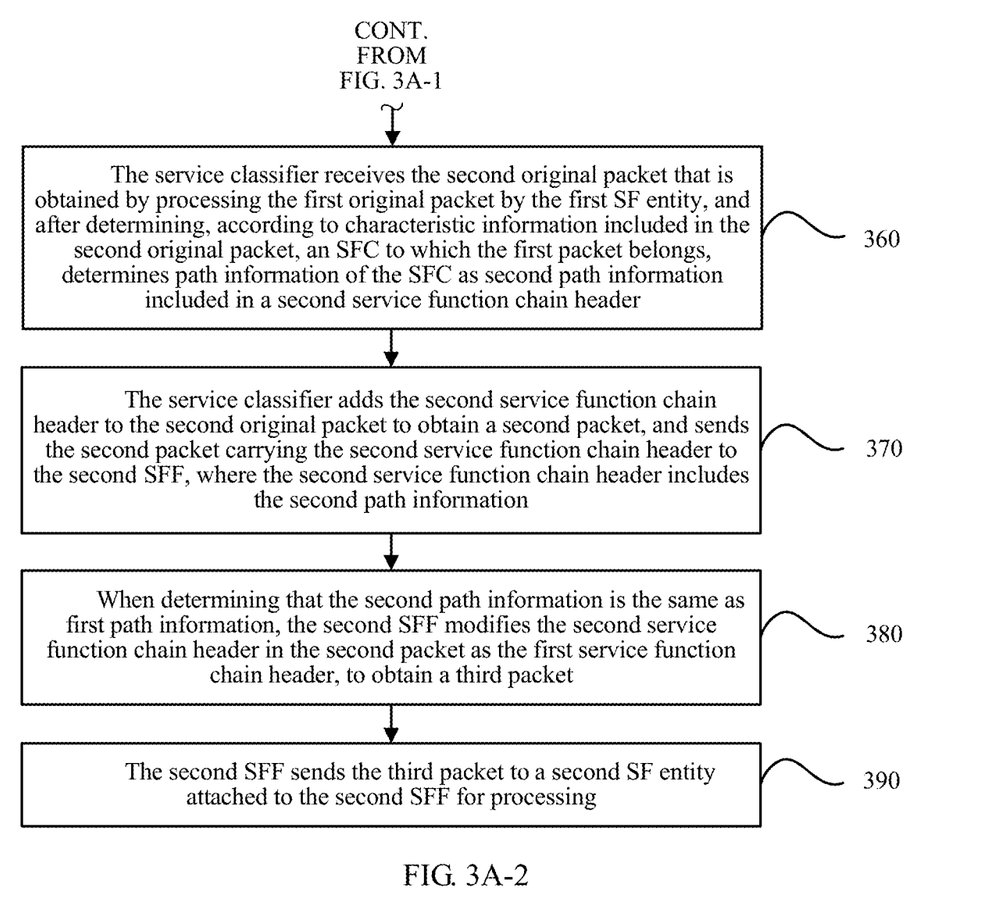
Figure 3B:
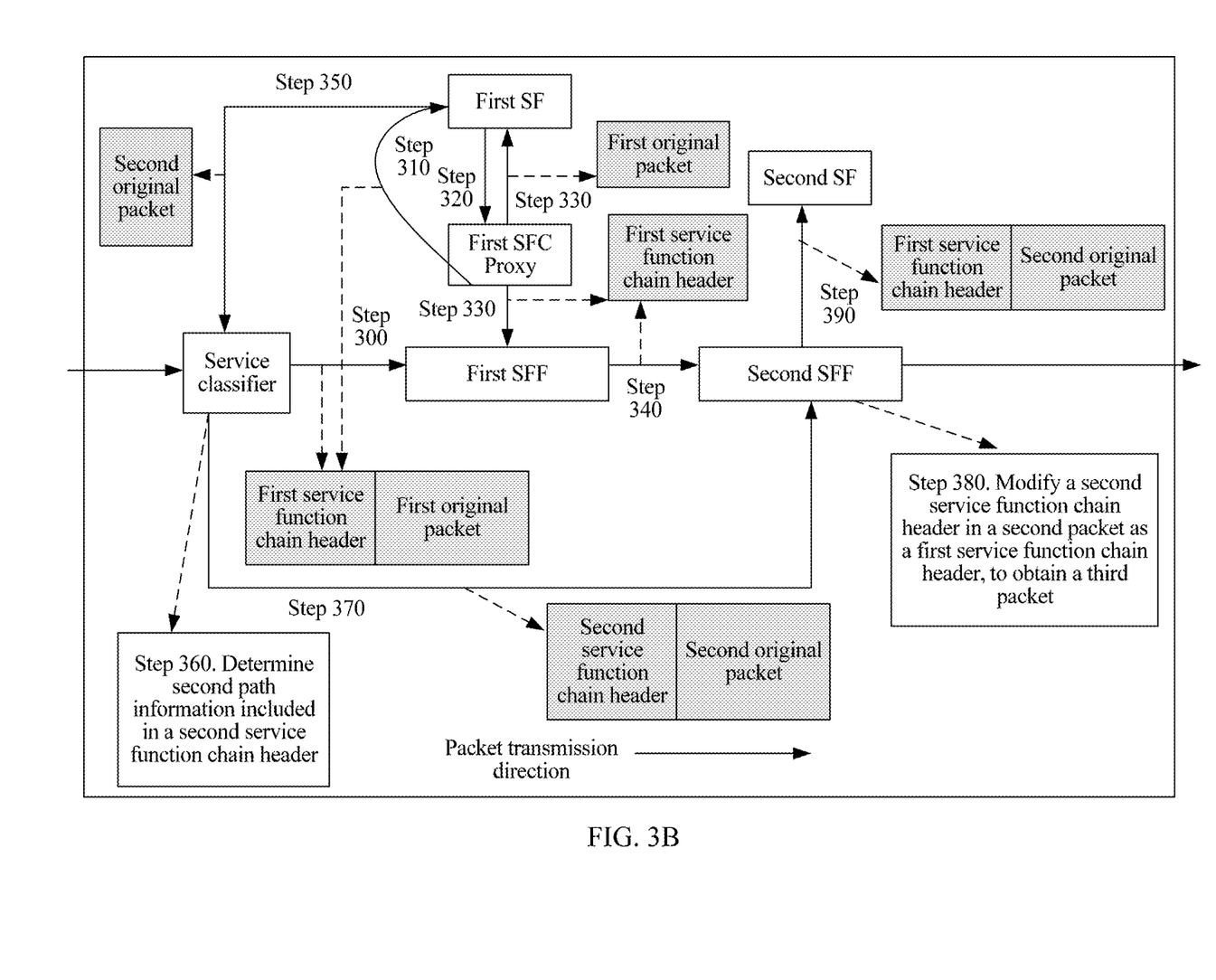
FIG. 3B is a schematic diagram of packet processing according to an embodiment of the present invention.

Referring to FIG. 3A-1 and FIG. 3A-2, in an embodiment of the present invention, an embodiment of packet processing is as follows (FIG. 3B is a schematic diagram of this process):

Step 300: A service classifier sends a first packet to a first SFF, where the first packet includes a first service function chain header and a first original packet.

In this step, the first packet may be sent by a previous-hop SFF instead of the service classifier.

Step 310: The first SFF sends the first packet to a first SF entity attached to the first SFF.

Step 320: The first SF entity sends the first packet to a first SFC proxy of the first SF entity when determining that the first service function chain header in the first packet cannot be identified.

Certainly, the first packet may be captured by the first SFC proxy in a process in which the first SFF sends the first packet to the first SF entity.

Step 330: The first SFC proxy splits the first packet to obtain the first service function chain header and the first original packet, sends the first original packet to the first SF entity, and sends the first service function chain header to the first SFF.

Step 340: The first SFF sends the first service function chain header to a second SFF.

Step 350: The first SF entity receives the first original packet sent by the first SFC proxy, processes the first original packet to obtain a second original packet, and sends the second original packet to the service classifier.

Step 360: The service classifier receives the second original packet that is obtained by processing the first original packet by the first SF entity, and after determining, according to characteristic information included in the second original packet, an SFC to which the first packet belongs, determines path information of the SFC as second path information included in a second service function chain header.

Step 370: The service classifier adds the second service function chain header to the second original packet to obtain a second packet, and sends the second packet carrying the second service function chain header to the second SFF, where the second service function chain header includes the second path information.

Step 380: When determining that the second path information is the same as first path information, the second SFF changes the second service function chain header in the second packet into the first service function chain header, to obtain a third packet.

Step 390: The second SFF sends the third packet to a second SF entity attached to the second SFF for processing.

In FIG. 3A-1 and FIG. 3A-2, a scenario in which the first SF entity directly sends, to the service classifier, the second original packet obtained after processing is described. Certainly, the first SF entity may first return the second original packet to the first SFC proxy of the first SF entity, and the first SFC proxy then sends the second original packet to the service classifier. Other processes are the same, and details are not repeatedly described herein.

In conclusion, in this embodiment of the present invention, a second SFF receives a first service function chain header sent by a first SFF, where the first service function chain header is obtained and sent to the first SFF after a first SFC proxy of a first SF entity attached to the first SFF splits a first packet, and the first packet includes the first service function chain header and a first original packet. The second SFF receives a second packet that is obtained and sent by a service classifier after the service classifier adds a second service function chain header to a second original packet, where the second original packet is obtained by processing the first original packet by the first SF entity. The second SFF changes the second service function chain header in the second packet into the first service function chain header. In this solution, the first SFC proxy of the first SF entity splits the first packet to obtain the first original packet and the first service function chain header, sends the first original packet to the first SF entity for processing, and sends the first service function chain header to the first SFF. The first SFF sends the first service function chain header to the second SFF. The first SF entity processes the first original packet to obtain the second original packet, and sends the second original packet to the service classifier. The service classifier sends, to the second SFF, the second packet that is obtained after the service classifier adds the second service function chain header to the second original packet. The second SFF changes the second service function chain header in the second packet into the first service function chain header. In this way, a first packet carrying a first service function chain header can be transmitted in a network architecture in which a legacy SF exists, so that the legacy SF becomes compatible.

Figure 4A:
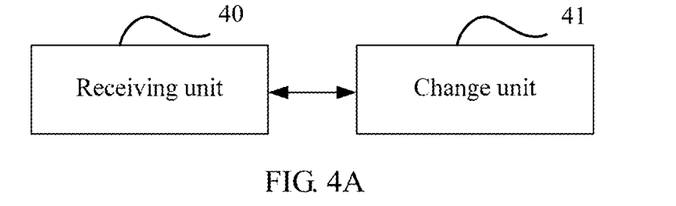
FIG. 4A is a schematic structural diagram of an SFF according to an embodiment of the present invention.

Based on the technical solutions of the foregoing corresponding methods, referring to FIG. 4A, an embodiment of the present invention provides an SFF, and the SFF includes a receiving unit 40 and a change unit 41.

The receiving unit 40 is configured to receive a first service function chain header sent by a first SFF, where the first service function chain header is obtained and sent to the first SFF after a first SFC proxy of a first service function SF entity attached to the first SFF splits a first packet, and the first packet includes the first service function chain header and a first original packet.

The receiving unit 40 is further configured to receive a second packet that is obtained and sent by a service classifier after the service classifier adds a second service function chain header to a second original packet, where the second original packet is obtained by processing the first original packet by the first SF entity.

The change unit 41 is configured to change the second service function chain header in the second packet into the first service function chain header.

In this embodiment of the present invention, optionally, the change unit 41 is specifically configured to:

change the second service function chain header in the second packet into the first service function chain header according to path information included in the first service function chain header and path information included in the second service function chain header.

In this embodiment of the present invention, optionally, the change unit 41 is specifically configured to:

change the second service function chain header in the second packet into the first service function chain header when determining that the path information included in the first service function chain header is the same as the path information included in the second service function chain header.

In this embodiment of the present invention, optionally, the second service function chain header is specifically obtained after the service classifier determines, according to characteristic information included in the second original packet, an SFC to which the first packet belongs and then adds path information of the SFC as the second path information. Metadata in the second service function chain header is empty or includes initial information.

In this embodiment of the present invention, optionally, first metadata in the first service function chain header includes processing result information obtained after an SF entity before the first SF entity in the SFC processes the first packet. In this way, efficiency of processing a third packet by a second SF entity may be improved.

Figure 4B:
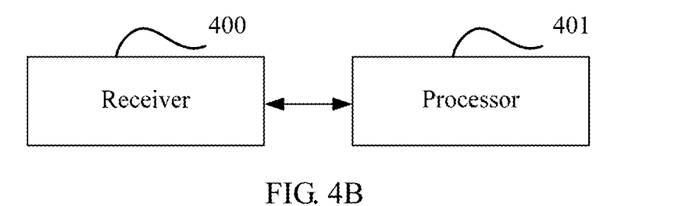
FIG. 4B is another schematic structural diagram of an SFF according to an embodiment of the present invention.

As shown in FIG. 4B, FIG. 4B is another schematic structural diagram of an SFF according to an embodiment of the present invention, and the SFF includes a receiver 400 and a processor 401.

The receiver 400 is configured to receive a first service function chain header sent by a first SFF, where the first service function chain header is obtained and sent to the first SFF after a first SFC proxy of a first service function SF entity attached to the first SFF splits a first packet, and the first packet includes the first service function chain header and a first original packet.

The receiver 400 is further configured to receive a second packet that is obtained and sent by a service classifier after the service classifier adds a second service function chain header to a second original packet, where the second original packet is obtained by processing the first original packet by the first SF entity.

The processor 401 is configured to change the second service function chain header in the second packet into the first service function chain header.

In this embodiment of the present invention, optionally, the processor 401 is specifically configured to:

change the second service function chain header in the second packet into the first service function chain header according to path information included in the first service function chain header and path information included in the second service function chain header.

In this embodiment of the present invention, optionally, the processor 401 is specifically configured to:

change the second service function chain header in the second packet into the first service function chain header when determining that the path information included in the first service function chain header is the same as the path information included in the second service function chain header.

In this embodiment of the present invention, optionally, the second service function chain header is specifically obtained after the service classifier determines, according to characteristic information included in the second original packet, an SFC to which the first packet belongs and then adds path information of the SFC as the second path information. Metadata in the second service function chain header is empty or includes initial information.

In this embodiment of the present invention, optionally, first metadata in the first service function chain header includes processing result information obtained after an SF entity before the first SF entity in the SFC processes the first packet. In this way, efficiency of processing, by a second SF entity, a third packet sent by the SFF may be improved.

Figure 5A:
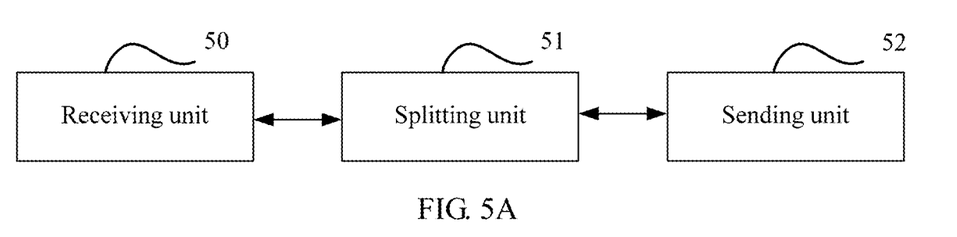
FIG. 5A is a schematic structural diagram of an SFC proxy according to an embodiment of the present invention.

Based on the technical solutions of the foregoing corresponding methods, referring to FIG. 5A, an embodiment of the present invention provides an SFC proxy, and the SFC proxy includes a receiving unit 50, a splitting unit 51, and a sending unit 52.

The receiving unit 50 is configured to receive, as a proxy of a first service function SF entity, a first packet sent by a first service function forwarder SFF, where the first packet includes a first service function chain header and a first original packet.

The splitting unit 51 is configured to split the first packet to obtain the first service function chain header and the first original packet.

The sending unit 52 is configured to send the first original packet to the first SF entity and return the first service function chain header to the first SFF.

In this embodiment of the present invention, further, the receiving unit 50 is further configured to receive a second original packet that is obtained by processing the first original packet by the first SF entity.

The sending unit 52 is further configured to send the second original packet to a service classifier.

That is, after processing the first original packet to obtain the second original packet, the first SF entity may send the second original packet to the first SFC proxy of the first SF entity, and the first SFC proxy sends the second original packet to the service classifier.

Figure 5B:
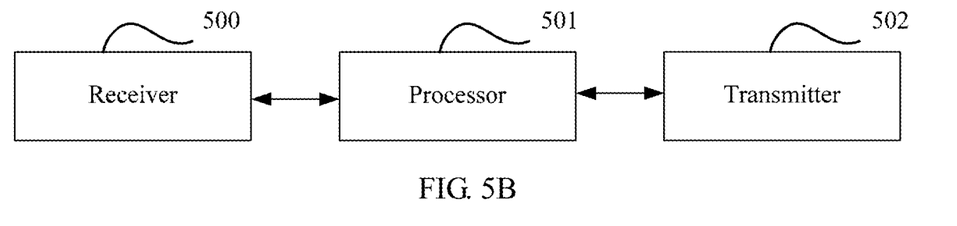
FIG. 5B is another schematic structural diagram of an SFC proxy according to an embodiment of the present invention.

As shown in FIG. 5B, FIG. 5B is another schematic structural diagram of an SFC proxy according to an embodiment of the present invention, and the SFC proxy includes a receiver 500, a processor 501, and a transmitter 502.

The receiver 500 is configured to receive, as a proxy of a first service function SF entity, a first packet sent by a first service function forwarder SFF, where the first packet includes a first service function chain header and a first original packet.

The processor 501 is configured to split the first packet to obtain the first service function chain header and the first original packet.

The transmitter 502 is configured to send the first original packet to the first SF entity and return the first service function chain header to the first SFF.

In this embodiment of the present invention, further, the receiver 500 is further configured to receive a second original packet that is obtained by processing the first original packet by the first SF entity.

The transmitter 502 is further configured to send the second original packet to a service classifier.

Figure 6A:
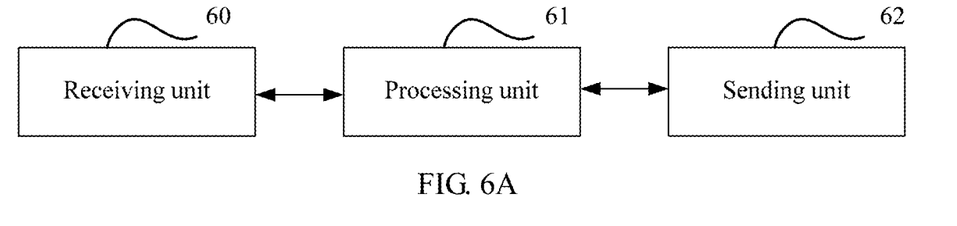
FIG. 6A is a schematic structural diagram of an SF entity according to an embodiment of the present invention.

Based on the technical solutions of the foregoing corresponding methods, referring to FIG. 6A, an embodiment of the present invention provides an SF entity, and the SF entity includes a receiving unit 60, a processing unit 61, and a sending unit 62.

The receiving unit 60 is configured to receive a first original packet sent by a first SFC proxy of the SF entity, where the first original packet is obtained after the first SFC proxy splits a received first packet sent by a first SFF, and the first packet includes the first original packet and a first service function chain header.

The processing unit 61 is configured to process the first original packet to obtain a second original packet.

The sending unit 62 is configured to send the second original packet to a service classifier.

In this embodiment of the present invention, when the sending unit 62 sends the second original packet to the service classifier, the following two manners may be used.

The sending unit 62 directly sends the second original packet to the service classifier.

Alternatively, the sending unit 62 sends the second original packet to the first SFC proxy, and the first SFC proxy sends the second original packet to the service classifier.

Figure 6B:
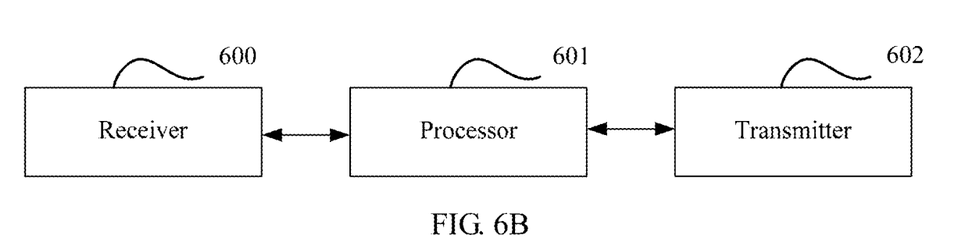
FIG. 6B is another schematic structural diagram of an SF entity according to an embodiment of the present invention.

As shown in FIG. 6B, FIG. 6B is another schematic structural diagram of an SF entity according to an embodiment of the present invention, and the SF entity includes a receiver 600, a processor 601, and a transmitter 602.

The receiver 600 is configured to receive a first original packet sent by a first SFC proxy of the SF entity, where the first original packet is obtained after the first SFC proxy splits a received first packet sent by a first SFF, and the first packet includes the first original packet and a first service function chain header.

The processor 601 is configured to process the first original packet to obtain a second original packet.

The transmitter 602 is configured to send the second original packet to a service classifier.

In this embodiment of the present invention, when the transmitter 602 sends the second original packet to the service classifier, the following two manners may be used.

The transmitter 602 directly sends the second original packet to the service classifier.

Alternatively, the transmitter 602 sends the second original packet to the first SFC proxy, and the first SFC proxy sends the second original packet to the service classifier.

Figure 7A:
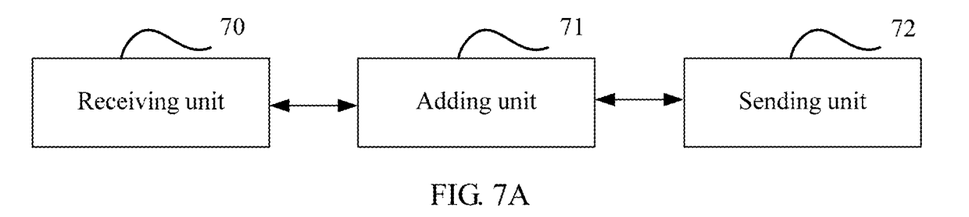
FIG. 7A is a schematic structural diagram of a service classifier according to an embodiment of the present invention.

Based on the technical solutions of the foregoing corresponding methods, referring to FIG. 7A, an embodiment of the present invention provides a service classifier, and the service classifier includes a receiving unit 70, an adding unit 71, and a sending unit 72.

The receiving unit 70 is configured to receive a second original packet, where the second original packet is obtained by processing a first original packet by a first SF entity attached to a first service function forwarder SFF, the first original packet is obtained after a first SFC proxy of the first SF entity splits a received first packet sent by the first SFF, and the first packet includes the first original packet and a first service function chain header.

The adding unit 71 is configured to add a second service function chain header to the second original packet to obtain a second packet, where the second service function chain header includes second path information.

The sending unit 72 is configured to send the second packet to a second SFF.

In this embodiment of the present invention, optionally, the adding unit 71 is specifically configured to:

after determining, according to characteristic information included in the second original packet, an SFC to which the first packet belongs, add path information of the SFC as the second path information, and set metadata included in the second service function chain header to be empty or to include initial information.

Figure 7B:
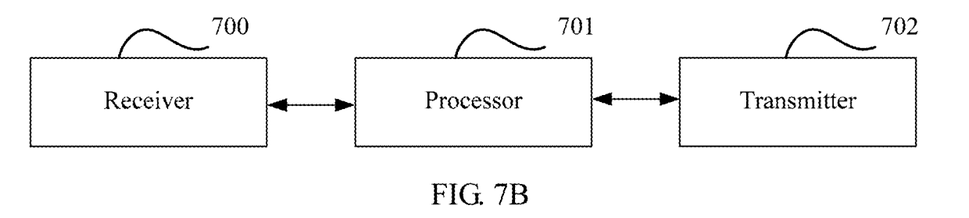
FIG. 7B is another schematic structural diagram of a service classifier according to an embodiment of the present invention.

As shown in FIG. 7B, FIG. 7B is another schematic structural diagram of a service classifier according to an embodiment of the present invention, and the service classifier includes a receiver 700, a processor 701, and a transmitter 702.

The receiver 700 is configured to receive a second original packet, where the second original packet is obtained by processing a first original packet by a first SF entity attached to a first SFF, the first original packet is obtained after a first SFC proxy of the first SF entity splits a received first packet sent by the first SFF, and the first packet includes the first original packet and a first service function chain header.

The processor 701 is configured to add a second service function chain header to the second original packet to obtain a second packet, where the second service function chain header includes second path information.

The transmitter 702 is configured to send the second packet to a second SFF.

In this embodiment of the present invention, optionally, the processor 701 is specifically configured to:

after determining, according to characteristic information included in the second original packet, an SFC to which the first packet belongs, add path information of the SFC as the second path information, and set metadata included in the second service function chain header to be empty or to include initial information.

Figure 8A:
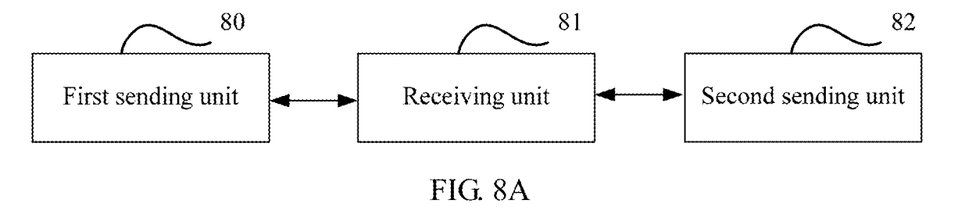
FIG. 8A is a schematic structural diagram of an SFF according to an embodiment of the present invention.

Based on the technical solutions of the foregoing corresponding methods, referring to FIG. 8A, an embodiment of the present invention provides an SFF, and the SFF includes a first sending unit 80, a receiving unit 81, and a second sending unit 82.

The first sending unit 80 is configured to send a first packet to a first SF entity attached to the SFF.

The receiving unit 81 is configured to receive a first service function chain header that is obtained and returned by a first SFC proxy of the first SF entity after the first SFC proxy of the first SF entity splits the first packet, where the first packet includes a first original packet and the first service function chain header.

The second sending unit 82 is configured to send the first service function chain header to a second SFF.

Figure 8B:
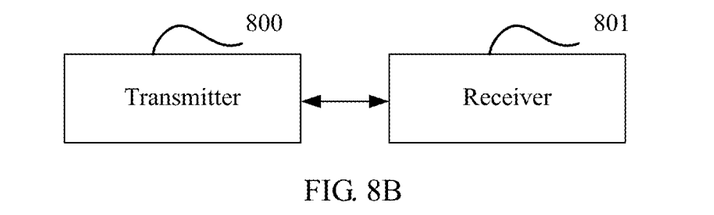
FIG. 8B is another schematic structural diagram of an SFF according to an embodiment of the present invention.

As shown in FIG. 8B, FIG. 8B is another schematic structural diagram of an SFF according to an embodiment of the present invention, and the SFF includes a transmitter 800 and a receiver 801.

The transmitter 800 is configured to send a first packet to a first SF entity attached to the SFF.

The receiver 801 is configured to receive a first service function chain header that is obtained and returned by a first SFC proxy of the first SF entity after the first SFC proxy of the first SF entity splits the first packet, where the first packet includes a first original packet and the first service function chain header.

The transmitter 800 is further configured to send the first service function chain header to a second SFF.

The present invention is described with reference to flowcharts and/or block diagrams of the method, the device (system), and the computer program product according to the embodiments of the present invention. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that an apparatus for implementing a specific function in one or more procedures in the flowcharts and/or in one or more blocks in the block diagrams is generated by using the instructions executed by a computer or a processor of another programmable data processing device.

These computer program instructions may also be stored in a computer readable memory that can instruct the computer or another programmable data processing device to work in a specific manner, so that an artifact that includes an instruction apparatus is generated by using the instructions stored in the computer readable memory. The instruction apparatus implements a specific function in one or more procedures in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the embodiments and all changes and modifications falling within the scope of the present invention.

What is claimed is:

1. A packet processing method, comprising:
   receiving, by a second service function forwarder (SFF), a first service function chain (SFC) header sent by a first SFF, wherein the first SFC header is obtained and sent to the first SFF after a first SFC proxy of a first service function (SF) entity attached to the first SFF splits a first packet, and the first packet comprises the first SFC header and a first original packet;
   receiving, by the second SFF, a second packet that is obtained and sent by a service classifier after the service classifier adds a second SFC header to a second original packet, wherein the second original packet is obtained by processing the first original packet by the first SF entity; and
   changing, by the second SFF, the second SFC header in the second packet into the first SFC header.

2. The method according to claim 1, wherein the changing, by the second SFF, the second SFC header in the second packet into the first SFC header comprises:
   changing, by the second SFF, the second SFC header in the second packet into the first SFC header according to path information comprised in the first SFC header and path information comprised in the second SFC header.

3. The method according to claim 2, wherein the changing, by the second SFF, the second SFC header in the second packet into the first SFC header comprises:
   changing, by the second SFF, the second SFC header in the second packet into the first SFC header when determining that the path information comprised in the first SFC header is the same as the path information comprised in the second SFC header.

4. The method according to claim 2, wherein the second SFC header is specifically obtained after the service classifier determines, according to characteristic information comprised in the second original packet, an SFC to which the first packet belongs and then adds path information of the SFC as the second path information, and second metadata in the second SFC header is empty or comprises initial information.

5. A service function forwarder (SFF), comprising:
   a receiver, configured to receive a first service function chain (SFC) header sent by a first SFF, wherein the first SFC header is obtained and sent to the first SFF after a first SFC proxy of a first service function (SF) entity attached to the first SFF splits a first packet, and the first packet comprises the first SFC header and a first original packet, wherein
   the receiver is further configured to receive a second packet that is obtained and sent by a service classifier after the service classifier adds a second SFC header to a second original packet, wherein the second original packet is obtained by processing the first original packet by the first SF entity; and
   a processor, configured to change the second SFC header in the second packet into the first SFC header.

6. The SFF according to claim 5, wherein the processor is specifically configured to:
   change the second SFC header in the second packet into the first SFC header according to path information comprised in the first SFC header and path information comprised in the second SFC header.

7. The SFF according to claim 6, wherein the processor is specifically configured to:
   change the second SFC header in the second packet into the first SFC header when determining that the path information comprised in the first SFC header is the same as the path information comprised in the second SFC header.

8. The SFF according to claim 6, wherein the second SFC header is specifically obtained after the service classifier determines, according to characteristic information comprised in the second original packet, an SFC to which the first packet belongs and then adds path information of the SFC as the second path information, and metadata in the second SFC header is empty or comprises initial information.

9. A service classifier, comprising:
a receiver, configured to receive a second original packet, wherein the second original packet is obtained by processing a first original packet by a first service function (SF) entity attached to a first service function forwarder (SFF), the first original packet is obtained after a first service function chain (SFC) proxy of the first SF entity splits a received first packet sent by the first SFF, and the first packet comprises the first original packet and a first SFC header;

a processor, configured to add a second SFC header to the second original packet to obtain a second packet, wherein the second SFC header is to be changed into the first SFC header, and the second SFC header comprises second path information for determining the first SFC header, which comprises first path information which is the same as the second path information; and a transmitter, configured to send the second packet to a second SFF.

10. The service classifier according to claim 9, wherein the processor is specifically configured to:
after determining, according to characteristic information comprised in the second original packet, an SFC to which the first packet belongs, add path information of the SFC as the second path information, and set metadata comprised in the second SFC header to be empty or to comprise initial information.

* * * * *